June 19, 1951     J. RABINOWITZ ET AL     2,557,685
PROJECTION PRINTER Filed July 17, 1947     4 Sheets-Sheet 2

INVENTOR
JACOB RABINOWITZ
SAMUEL P. ZBELL
BY
John E. Hubbell
ATTORNEY

June 19, 1951  J. RABINOWITZ ET AL  2,557,685
PROJECTION PRINTER

Filed July 17, 1947  4 Sheets-Sheet 3

INVENTOR
JACOB RABINOWITZ
SAMUEL P. ZBELL
BY
John E. Hubbell
ATTORNEY

Fig. 9.

Patented June 19, 1951

2,557,685

UNITED STATES PATENT OFFICE 2,557,685

PROJECTION PRINTER

Jacob Rabinowitz, Brooklyn, and Samuel P. Zbell, Pelham, N. Y., assignors to Pavelle Color Incorporated, New York, N. Y., a corporation of Delaware Application July 17, 1947, Serial No. 761,468

10 Claims. (Cl. 88—24)

The present invention relates to projection printing apparatus of the general type disclosed in the prior application of Leo Pavelle, Serial No. 614,628, filed September 5, 1945. The apparatus disclosed in said prior application is used to photographically reproduce a picture on a transparency by passing light through the transparency, a focusing lens and a shutter on to an elongated film or strip of photographic material which is intermittently advanced by strip feeding mechanism to successively print a plurality of pictures, one at a time, on a corresponding plurality of successive longitudinal sections of the strip.

The general object of the present invention is to provide improved automatic projection printing apparatus of the above mentioned general type, characterized by its capacity for printing separate, side by side pictures, one on each half width of the strip by simultaneously reproducing the picture on a single transparency, or by successively reproducing the different pictures on two transparencies. The two half widths of the strip on which side by side pictures are thus reproduced, are hereinafter identified and distinguished by referring to one as the upper half, and referring to the other as the lower half of the strip.

In modifying apparatus of said known type to adapt it for use in accordance with the present invention, we replace the single lens heretofore used in reproducing a single picture on each of the successively advanced strip sections, by two side by side lenses, one of which is adapted to reproduce a transparency picture on the upper half, while the other lens is adapted to reproduce the same or a different transparency picture on the lower half of the strip, and provide a separately operable blind or closure for each lens, separate from and operable independent of the shutter mechanism which directly controls the exposure of the strip to the printing light.

A specific object of the present invention is to provide simple and effective means, operable at the will of the operator to simultaneously reproduce a transparency picture on each of the upper and lower halves of one section of the printing film or strip, and to thereafter advance the film to bring a following section of the film into printing position preparatory to another printing operation, or alternatively, to first reproduce one transparency picture on one half of one section of the strip and then reproduce a second transparency picture on the other half of the last mentioned section of the strip before advancing the strip.

The capacity of the apparatus for optional operation in each of the two ways just described is practically important in the commercial reproduction of pictures. The cost per picture is inherently lower when two pictures are simultaneously produced from a single transparency than when the two pictures are reproduced from the same transparency in separate printing operations. However, it is sometimes necessary to fill orders for single pictures and orders for odd numbers of pictures reproduced from a single transparency. The ability to reproduce one transparency picture on the one half of one longitudinal strip section, and to subsequently reproduce a second transparency picture on the other half of the same section, makes it possible to make single reproductions from transparencies with a desirable saving of printing and developing material and time.

Further objects of the invention are to provide projection printing apparatus of the type for use in printing two side by side pictures on a single longitudinal section of a film, as above described, including mechanism of the type disclosed in said prior Pavelle application for making the duration of such exposure period automatically dependent on the characteristics of the transparency being reproduced, and for adjusting the apparatus, preparatory to each printing operation, to print either a single picture or a predetermined plurality of pictures from a single transparency and for automatically moving each film or strip section out of the printing position immediately following the exposure of its two halves whether the latter are exposed simultaneously or in different printing operations, and thus simultaneously advance a following film section into printing position.

The various features of novelty which characterize our invention are pointed out with particularity in the claims annexed to and forming a part of this specification. For a better understanding of the invention, however, its advantages and specific objects attained with its use, reference should be had to the accompanying drawing and descriptive matter in which we have illustrated and described a preferred embodiment of the invention.

Figures 1, 1A:
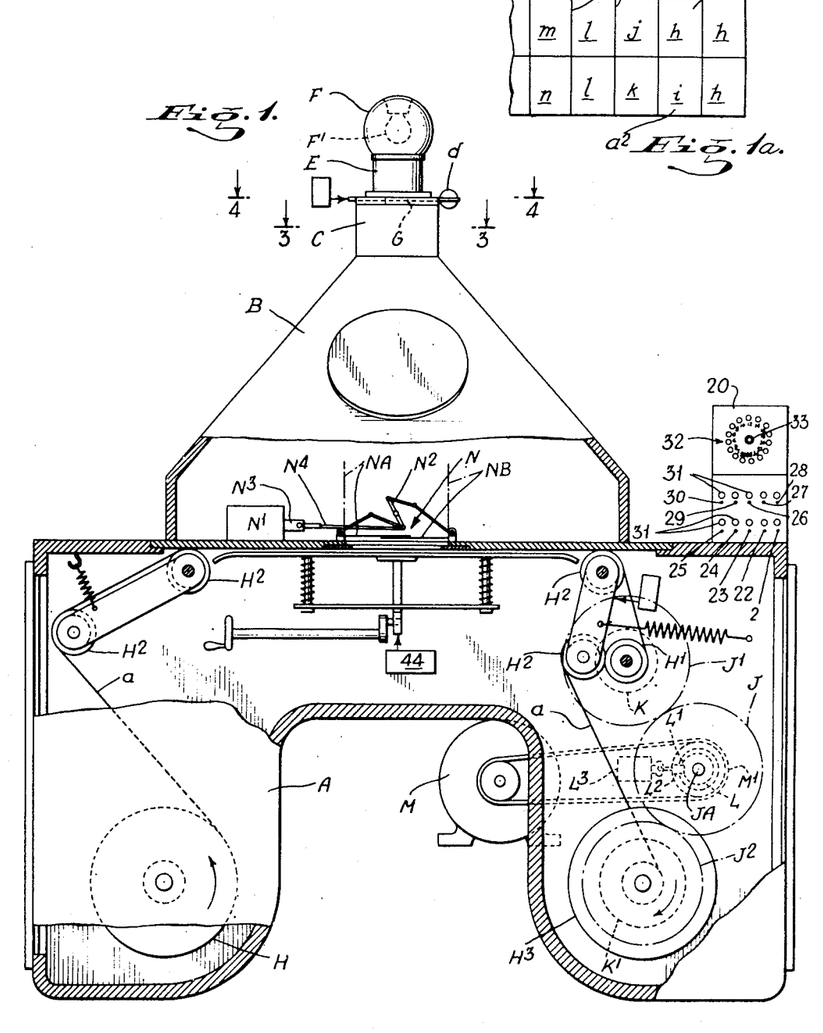
Fig. 1 is a somewhat diagrammatic elevation, partly in section of a projection printer.
Fig. 1a is a plan showing a portion of the printing material strip on which pictures have been reproduced.
Figure 4:
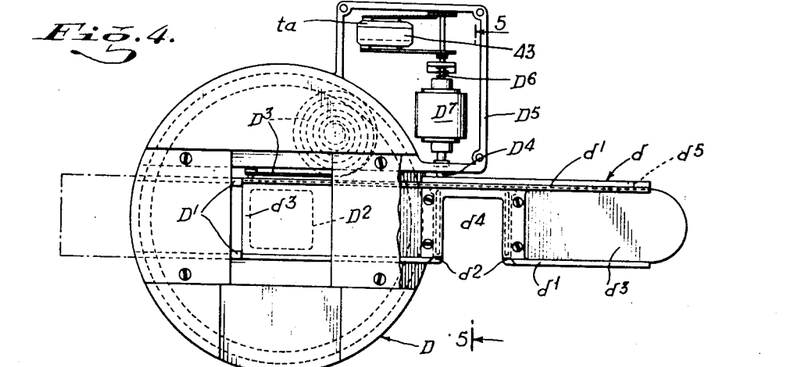
Fig. 4 is a plan section on the line 4—4 of Fig. 1 illustrating the transparency holder and associated mechanism.
Figure 5:
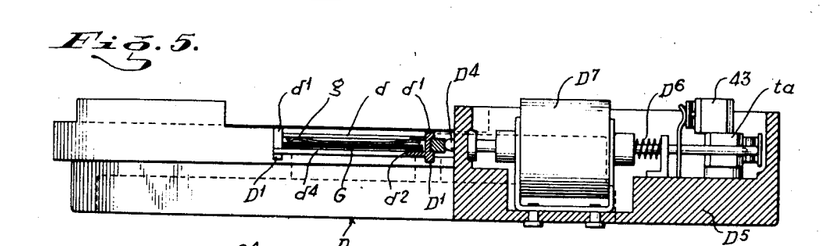
Fig. 5 is an elevation partly in section of the apparatus shown in Fig. 4.

The drawings illustrate the use of the present invention in a projection printer comprising a housing or hollow frame structure including a strip or film housing section A, a projector housing section B, a focusing lens section C, a transparency supporting section D, a condenser section E, and a lamp housing section F. The sections A, B, C, D, E and F are normally rigidly connected, though it is usually convenient to separately form each of said sections. The apparatus shown in Fig. 1 is intended for use in reproducing pictures on a film $a$ in the lamp housing A, by transmitting light from a lamp F' in the lamp housing F through a transparency G supported in a transparency holder $d$, slidably mounted in the housing section D. The holder $d$ is moved transversely to the axis of the printer between a position in which its picture supporting seat $d^4$ is outside of the printer structure as shown in Figs. 4 and 5, into a position in which a transparency mounted in the seat $d^4$ extends across the path of light passing from the lamp F' to the lenses P and $p$.

The film housing A encloses apparatus for supporting and intermittently advancing a film $a$ of light sensitive photograph material, to move successive longitudinal sections successively into register with an exposure orifice I formed in the top wall A' of the film housing A.

A portion of the film $a$ on which pictures $h$, $i$, $j$, $k$, $l$, $m$, and $n$, have been reproduced is shown in Fig. 1a. In that figure, $a'$ and $a^2$ respectively designate the upper and lower halves of the film $a$ and the transverse lines $a^3$ mark the divisions between the longitudinal film sections successively brought into register with the orifice I. Fig. 1a shows one suitable arrangement on the film of the pictures reproduced thereon selected by the operator in filling orders for 3 pictures $h$ from one transparency, 2 pictures $l$ from a second transparency, and single pictures $i$, $j$, $k$, $m$ and $n$, each made from a different transparency. In filling such an order, some other suitable arrangements of the pictures on the film may be made. However, the arrangement selected should ordinarily be one which avoids or minimizes the production of one picture only on any longitudinal film section and which will permit the maximum portion of each order for a plurality of pictures from a single transparency to be made in pairs with the two pictures of each pair made simultaneously on the same longitudinal film section.

As diagrammatically shown, the film advancing apparatus includes a supply roll H, a feed or measuring roll H', guide rolls H², a take-up roll H³, and mechanism for intermittently rotating the measuring roller H'. Said mechanism comprises a feed roller driving shaft HA, a spur gear J' journalled on the shaft HA and rotating the latter through a friction clutch K. The latter yields when necessary to permit further rotation of the gear J' after the rotation of the drive shaft HA is positively interrupted. The gear J' is in mesh with a driving gear J secured to the main driving shaft JA. The gear J is in mesh with a gear J² which is journalled on the drive shaft for the take-up roller H³, and rotates the latter through a second friction clutch K' as required to maintain the proper tension on the portion of the film passing to the take-up roll H³ from the feed roll H'. The main drive shaft JA is intermittently rotated through a one-way clutch L mounted on the shaft JA by a constantly rotating motor M. As shown, the motor is belt connected to a pulley M' which is journalled on the shaft JA and intermittently connected to the latter by the one-way clutch L.

The one-way clutch L may be of a well known commercially available type which is spring biased for adjustment into the condition in which it clutches the pulley M' to the shaft JA, but is actuated to interrupt the driving connection between the pulley and the shaft when a shoulder or projecting portion L' of the clutch L engages a normally stationary stop L². The stop L² is biased for movement into position for engagement with the shoulder L' but is retracted to permit a revolution of the shaft JA on the energization of a solenoid L³ which has its armature connected to the stop L². In the embodiment of the invention illustrated herein, the winding of the solenoid L³ is included in a control system circuit network shown in Fig. 9, by which the film feeding operations are operatively related to the movements of the transparency holder $d$ and to the condition of the shutter mechanism controlling the exposure of the film.

Associated with the feed roller drive shaft HA are means through which each feeding movement of the measuring roller is positively restricted to a definite angular extent. That movement with the apparatus shown, is 180°, but it may be made 360°, or 120° or some other aliquot part of 360°, as conditions make desirable. As shown, feeding movement of the roller H' is restricted to a movement of 180° with the particular apparatus shown, by means of a stop or locking dog HB which is biased for movement into a locking position in which it is adapted to engage one or another of two projections HC' from one end of a control drum HC secured to the shaft HA to thereby arrest the rotation of said shaft. The two projections HC' are symmetrically disposed at opposite sides of the shaft HA. The locking dog HB is retracted from its locking position by a solenoid HD when the latter is energized. In the control system shown in Fig. 9, the solenoid HD and the solenoid L³ are simultaneously energized to initiate a film feeding operation, and the solenoids are deenergized in time to permit the locking dogs L² and HB to return to their respective locking positions in time to restrict the turning movement of the main drive shaft JA to one revolution, and to restrict the rotation of the feed roller drive shaft HA to one-half a revolution. As will be apparent, the extent of each feeding movement of the film $a$ can be varied by varying the diameter of the feed roller H', as well as by varying the extent of angular movement permitted the feed roller drive shaft HA in such intermittent movement of the latter.

As is hereafter more fully explained, each exposure of a portion of the film $a$ is initiated by an opening adjustment, and is terminated by a closing adjustment of a main shutter N. The latter may be of conventional type, and as diagrammatically shown in Fig. 1 comprises shutter flaps NA and NB which are biased to turn about axes at opposite sides of the orifice I into closed positions shown in full lines, but are turned into open positions, shown in dotted lines in Fig. 1, by the energization of a solenoid winding N'. As diagrammatically shown in Fig. 1, the shutter flaps NA and NB have arms link connected to the opposite ends of an operating lever $N^2$. The latter is oscillated to turn the shutter flaps between their closed and open positions by a link $N^4$ connecting the lever to the armature $N^3$ of the solenoid N'.

Figure 6:
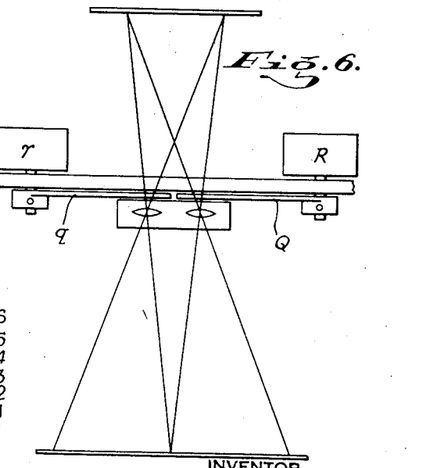
Fig. 6 is a diagrammatic representation of optical system features.

The previously mentioned picture holder d is mounted in a horizontal guideway D' which, as is clearly shown in Figs. 5 and 6, is formed in the housing part or section D. The latter is ordinarily a metallic casting interposed between the main lens housing C and the condenser housing E. The opposite sides of the guideway D' are located at opposite sides of the axis of the printer. The housing part D comprises a transverse web portion forming a light proof partition between the housings C and E except for a window $D^2$ which is shown as square and centrally disposed with respect to the axis of the printer.

The picture holder d comprises side members d' in the form of long bars engaging the side walls of the guideway D', and also comprises transverse frame members $d^2$ and a web portion $d^3$. The latter is integrally connected to the members d' and $d^2$, and extends for the full length of the picture holder, except where cut away to form an opening in the bottom wall of the picture seat $d^4$ which is located between the transverse ribs $d^2$ of the picture holder d. As shown, the member d' at one side of the picture holder is cut away between the ribs $d^2$, to permit a picture G to be moved horizontally into the seat $d^4$. Advantageously, and as shown each picture is mounted in a rim or edge frame g. The frame g may be formed of sheet metal, paper, plastic or other material and is shaped and proportioned to fit in the seat $d^4$ closely enough to insure proper centering of the picture with respect to the opening $D^2$, and loosely enough to permit the picture holder to be readily inserted in and removed from its seat. The usual provisions, which need not be described, may be made to prevent the passage of light into the housing structure through the ends of the guideway D' when the picture holder is in its printing position.

A spring $D^3$ mounted in the housing part D and connected to the picture holder d biases the latter for movement into its nonoperative position shown in Fig. 4 in which the picture seat $d^4$ is exposed. As shown, the spring $D^3$ is a spiral spring of the type customarily employed in typewriters to bias the typewriter carriage movement to the right, and need not be further described or illustrated since its specific form constitutes no part of the present invention. In normal operation when the picture holder is pushed into its printing position in which its picture seat $d^4$ is in register with the opening $D^2$, the holder is locked in place by a locking part $D^4$ mounted on a platform extension $D^5$ of the housing part D. A spring $D^6$ biases the part $D^4$ for movement into its locking position at the end of each printing operation or series of printing operations. In its locking position, the locking dog $D^4$ extends into an opening $d^5$ formed in the adjacent side of the holder d. At the conclusion of each printing operation, the locking dog $D^4$ is pulled out of its locking position by a solenoid $D^7$ which is then energized as hereinafter described.

In regard to its features already described, the projection printer disclosed herein may be of the type and form disclosed and claimed in said application for patent of Leo Pavelle, Serial No. 614,628, filed September 6, 1945, and now in commercial use in printing color pictures from natural color transparencies. And it is noted that some of said features are illustrated and described in greater detail in said prior application than they are herein. The prior application, however, does not disclose the apparatus shown in Figs. 2 and 3 hereof, as mounted in the lens section C, and does not disclose the control mechanism shown in Figs. 7 and 8 and associated control mechanism shown in Fig. 9 for controlling the operation of the auxiliary shutters or blinds, shown in Figs. 2 and 3, and for relating said control mechanism to control system elements which are common to the disclosures of the instant application and said prior application.

As shown, the housing section B comprises a conical body portion at the smaller upper end of which a seat is provided for the lower end of the focusing lens section C. The focusing lens section C shown in detail in Figs. 2 and 3 comprises a main tubular body portion, a lower coaxial tubular tenon portion C' which extends into the section B, and an annular portion integrally connecting the tenon portion C' to the body of the section and seating against the upper end of the section B. A lens supporting plate or disc $C^2$ coaxial with the member C is mounted in the latter adjacent its lower end, and a parallel, mechanism supporting plate or disc $C^3$ is mounted in the member C a short distance above the plate $C^2$. A tubular lens supporting member O coaxial with the disc $C^2$ extends through a central opening $C^4$ in the disc $C^2$. As shown, the external diameter of the member O is smaller than the opening $C^4$ in the disc $C^2$, and the member O is centered in the opening and adjusted axially, but not rotatively, thereof by a focusing ring member O' which is internally threaded for threaded engagement with the externally threaded member O. The adjusting member O' has an enlarged externally knurled lower end $O^2$ and has an outwardly extending flange $O^3$ at its upper end which is journalled in and held against axial movement relative to the disc $C^2$ by an annular retaining member $O^4$ secured to the underside of the disc $C^2$. The member O is prevented from rotation relative to the disc $C^2$ by a key or spline member $O^5$. Internally threaded stop members $O^6$ screwed on the end portions of the tubular lens supporting member O prevent over adjustment of the member O.

The member O comprises a transverse partition $O^7$ which extends across the bore of its tubular body and is formed with side by side openings $O^8$. Said openings are counter-bored to form seats for similar side by side focusing lenses p and P. When a transparency G is supported in the section D in the position in which it extends across the optical axis of the projection printer, as shown in Fig. 5, and the passage of light from the printing lamp F' in the housing F through the transparency and the lenses P and p is not obstructed, the lens P will reproduce the transparency picture on the upper half a' and the lens p will reproduce the same transparency picture on the lower half $a^2$ of one longitudinal section of the film a. As shown in Fig. 1a, each such film section is separated from each adjacent section by a transverse line $a^3$. The lenses P and $p$ are similar in construction and so mounted in the member O that an adjustment of the focusing member $o'$ which moves the lens P into proper focusing relation with the transparency D and film $a$, will also move the lens $p$ into proper focusing relation with said transparency and film. The lens supporting member O supports a vertical plate OA forming a light guard between the normal paths of light rays passing to the lenses and reducing the possibility of trouble due to stray light. As shown, the light guard plate OA extends into, and slides up and down in, a slot $C^5$ formed in the plate $C^3$ between the openings $C^6$ in that plate which are in register with the lenses P and $p$.

Pivoted blinds or auxiliary shutters Q and $q$ in the space between the discs $C^2$ and $C^3$ are mounted on the latter to turn about axes perpendicular to the disc $C^3$ and at opposite sides of the orifices $C^6$ of the disc $C^3$ in register with the lenses P and $p$ respectively. Each of said blinds is adapted to turn about its axis from a position in which it extends over the corresponding orifice $C^6$ into a position shown in dotted lines in Fig. 3 in which it is at one side of said orifice. The adjustment positions of the blinds or auxiliary shutters Q and $q$ during each period in which the main shutter mechanism is open, determines whether the upper half, the lower half, or both halves of a longitudinal section of the film will then be exposed.

As shown, the blind Q is in the form of a blade or vane carried by the lower end of the armature shaft $R'$ of a rotary electromagnetic relay R mounted on the disc $C^3$ through which the shaft $R'$ extends. The blind Q is biased by a spring $Q'$ for movement into the position in which it is directly above the lens P and prevents light from passing through the latter, but is moved into its position indicated in dotted lines in Fig. 3 when the winding $R^2$ of the relay R is energized, as hereinafter described. The blind $q$ is biased by a spring $q'$ for movement into its position directly above the lens $p$ and is carried by the shaft $r'$ of a rotary relay $r$ having an energizing winding $r^2$ and mounted on the upper side of the disc $C^3$. The blind $q$ is moved into its dotted line position when the winding $r^2$ is energized. The rotary relays R and $r$ may be counterparts, and are of a well known commercial type and need not be further described.

Figure 7:
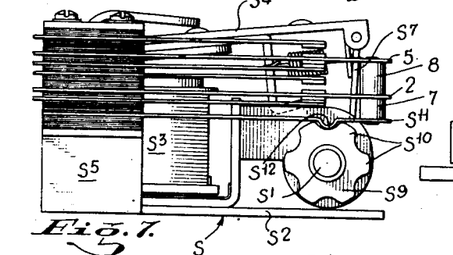
Figs. 7 and 8 are elevations showing the opposite sides of a ratchet relay controlling the energization of lens blinds.
Figure 8:
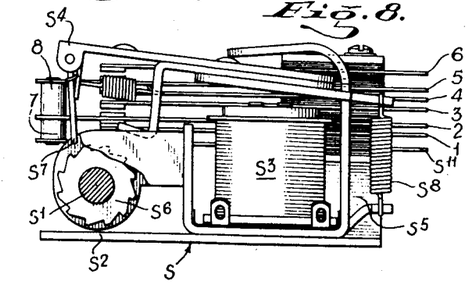

The intermittent energization of the relays R and $r$ is directly controlled by a ratchet relay switch mechanism S shown in Figs. 7 and 8. As shown, the relay S comprises a shaft $S'$ journalled in a framework $S^2$ which may be supported at any convenient place on the framework of the printer. The framework $S^2$ supports a relay winding $S^3$ and a ratchet lever $S^4$, a switch base $S^5$ and a plurality of spring members mounted in said base as hereinafter described. The shaft $S'$ carries a ratchet disc $S^6$ at one end, which is advanced a tooth at a time by the pawl $S^7$ carried by the ratchet lever $S^4$ on each energization of the winding $S^3$. The ratchet lever comprises an armature attracted by the said winding when the latter is energized. When the winding $S^3$ is deenergized, the ratchet lever $S^4$ is returned to its position shown in Fig. 8 by a bias spring $S^8$. At its end remote from the ratchet disc, the shaft $S'$ carries a star wheel $S^9$ having half as many peripheral projections $S^{10}$ as the ratchet disc has teeth. The rotation of the star wheel $S^9$ gives up and down movements to the free end of a spring lever $S^{11}$ which has its second end anchored in the switch base $S^5$.

The spring members mounted in the switch base $S^5$ comprise contacts 1, 2, 3, a stop member 4, and contacts 5 and 6 which are generally parallel to the lever $S^{11}$ and are at progressively greater distances from the latter. When the free end of the lever $S^{11}$ is raised by engagement of its shoulder, or depending loop portion $S^{12}$ with one of the projections $S^{10}$ of the star wheel $S^9$, it acts through a strut 7 of insulating material to raise the free end of the contact 2 and thereby move the contact 2 out of engagement with the contact 1 and into engagement with the contact 3. Similarly, the elevation of the contact 2 by the insulation strut 7 operates through a second insulation strut 8 to raise the free end of the contact 5. This moves the contact 5 out of engagement with the subjacent spring stop 4 and into engagement with the contact 6 above it. The lever $S^{11}$ is biased for movement of its loop portion $S^{12}$ to the bottom of the notch between the adjacent projections $S^{10}$ when the rotation of the star wheel permits. When the free end of the lever $S^{11}$ is thus permitted to approach the shaft $S'$, the spring contacts 2 and 5 are biased by their own resiliency for movement into engagement with the subjacent contacts 1 and 4, respectively.

The ratchet relay S and the auxiliary shutter relays R and $r$ are included in the control system shown in Fig. 9, and the manner in which the operation of these relays is made dependent on the condition of the main shutter mechanism N and in which their operation is related to the intermittent advancement of the film $a$, will now be explained. The relay S is actuated to advance the ratchet wheel $S^6$ one step following each closure of the main shutter N. Thus in the form diagrammatically illustrated, the movement of the shutter flap NA into its closed position, closes a switch $t$ which has one terminal connected through the hereinafter mentioned conductor 134 to an alternating current supply conductor $AC'$. The second terminal of the switch $t$ is connected by a conductor 9 to the cathode of a gaseous discharge valve T. The latter may well be a thyratron of the commercially available 2050 type, and has its anode connected by the winding of a relay $T'$ and a condenser $V'$ in parallel with said winding to the alternating supply conductor $AC^2$. The supply conductors $AC'$ and $AC^2$ may form part of a power distribution system supplying alternating current of conventional frequency and voltage, for example, 60 cycles per second and 110 volts. The condenser $V'$ maintains the energization of the relay $T'$ during the half cycles in which the valve T is non-conductive. The cathode of the valve T is connected to the supply conductor $AC^2$ through a resistor $U'$. The control grid of the valve T is connected to the supply conductor $AC'$ by a fixed resistor $U^2$ and a condenser $V^2$ in series with said resistor and with a variable resistor $U^3$ in parallel with the condenser $V^2$. The resistors $U'$ and $U^2$ may each have a resistance of 50,000 ohms and the condenser $V^2$ may have a capacitance of 1 microfarad. The resistors and condensers connected to the control grid of the valve T, as described, act as a delay device to prevent the valve T from becoming conductive for a quarter of a second or so after the switch $t$ is closed.

The relay T' in its deenergized condition, connects the conductor 9 through a conductor 10 to one terminal of the winding S³ of the ratchet relay S and also connects the conductor 9 through conductors 10 and 11 to one terminal of the release relay D⁷ for the transparency carrier d. The winding S³ has its second terminal connected to the supply conductor AC² and is energized as soon as the switch t is closed. When the switch t is closed, the carrier release relay D⁷ will or will not be energized, depending on whether or not the second terminal of the relay D⁷ is then connected to the supply conductor AC², and that depends in turn on the condition of the series printing control mechanism hereinafter described. As soon after the closure of the switch t as the valve T becomes conductive and energizes the relay T', the latter is actuated to thereby deenergize the ratchet delay S and to simultaneously deenergize the carrier release relay D⁷, if that relay is then energized. Owing to the above mentioned delay action of the resistances and condenser connecting the control grid of the valve T to the supply conductor AC', and thereby to the cathode of the valve T, the ratchet relay S and the release relay D⁷ may both be actuated before the relay T' opens their energizing circuits.

Each closure of the switch t thus effects the energization of the relay S to advance the ratchet S⁶ one tooth and thereby adjust the contact actuating lever S'' out of the upper or lower position previously occupied by it, and into its lower or upper position, respectively. When the energization of the winding S³ results in a down movement of the lever S'', the contact 2 engages the contact 1 and the contact 5 engages the spring stop arm 4. When the energization of the relay winding S³ results in an up movement of the lever S'', the contact 2 is moved into engagement with the contact 3 and the contact 5 is moved into engagement with the contact 6. As explained later, when the contacts 5 and 6 are in engagement, they cooperate to prevent a film feeding operation, following the exposure of the upper half a' of a longitudinal section of the film a, unless the lower half a² of the same film section is simultaneously exposed. The spring member 4 serves merely as a resilient stop tending to prevent excessive down movement of the contact D⁵.

The engagement of the ratchet relay contacts 2 and 3 effects the energization of the relay winding R² and thus moves the blind or auxiliary shutter Q into its open position so that light may pass through the lens P when the main shutter N is next open. Similarly, the engagement of the contacts 2 and 1 energizes the relay winding r² and thus moves the blind or auxiliary shutter q into its open position to permit the passage of light through the lens p when the main shutter N is next open. When the apparatus is adjusted, as hereinafter explained, to simultaneously print pictures on the upper and lower halves of the same longitudinal section of the film a, the contacts 1 and 3 are electrically connected, and the movement of the contact 2 up into engagement with the contact 3 or down into engagement with the contact 1, will then simultaneously energize both of the auxiliary shutter relay windings R² and r².

The energization of the relay winding R², effected by electrically connecting the contacts 2 and 3, results from the fact that one terminal of the winding R² is directly connected to the supply conductor AC², while the second terminal of the winding R² is connected by a conductor 12 to the contact 3 of the relay S, and the further fact that the contact 2 is connected to the supply conductor AC' through a gaseous discharge valve TA. The contact 2 is directly connected to the anode of the tube TA. The latter has its cathode connected to the supply conductor AC' through a switch ta during the period in which the transparency holder D is in its printing position. The valve TA may well be a thyratron of commercially available 2050 type. The cathode of the valve TA which is connected directly to the supply conductor AC' on the closure of the switch ta is also connected to the supply conductor AC² through a resistor U⁴, and the control grid of the valve TA is connected to the supply conductor AC' by a resistor U⁵. The resistors U⁴ and U⁵ may each have a resistance of 50,000 ohms. As shown, the relay windings R² and r² are each shunted by a separate condenser V³ operative to maintain the energization of the winding during half cycles in which the valve TA is non-conductive. Advantageously, and as shown, each of the windings R² and r² is also shunted by a signal lamp r³.

As diagrammatically shown, the switch ta is closed and opened by the movements of the armature of the carrier release relay D⁷ which move the locking dog D⁴ into and out of its locking position in which it extends into the opening d⁵ in the carrier d, as indicated in Fig. 4. The switch ta may be a commercially available microswitch. The contact 1 is connected to one terminal of the relay winding r² by a conductor 13, and the second terminal of that winding is permanently connected to the supply conductor AC². The relay winding r² is thus energized when the contacts 1 and 2 are electrically connected, just as the relay winding R² is energized when the contacts 2 and 3 are electrically connected.

Figure 9:
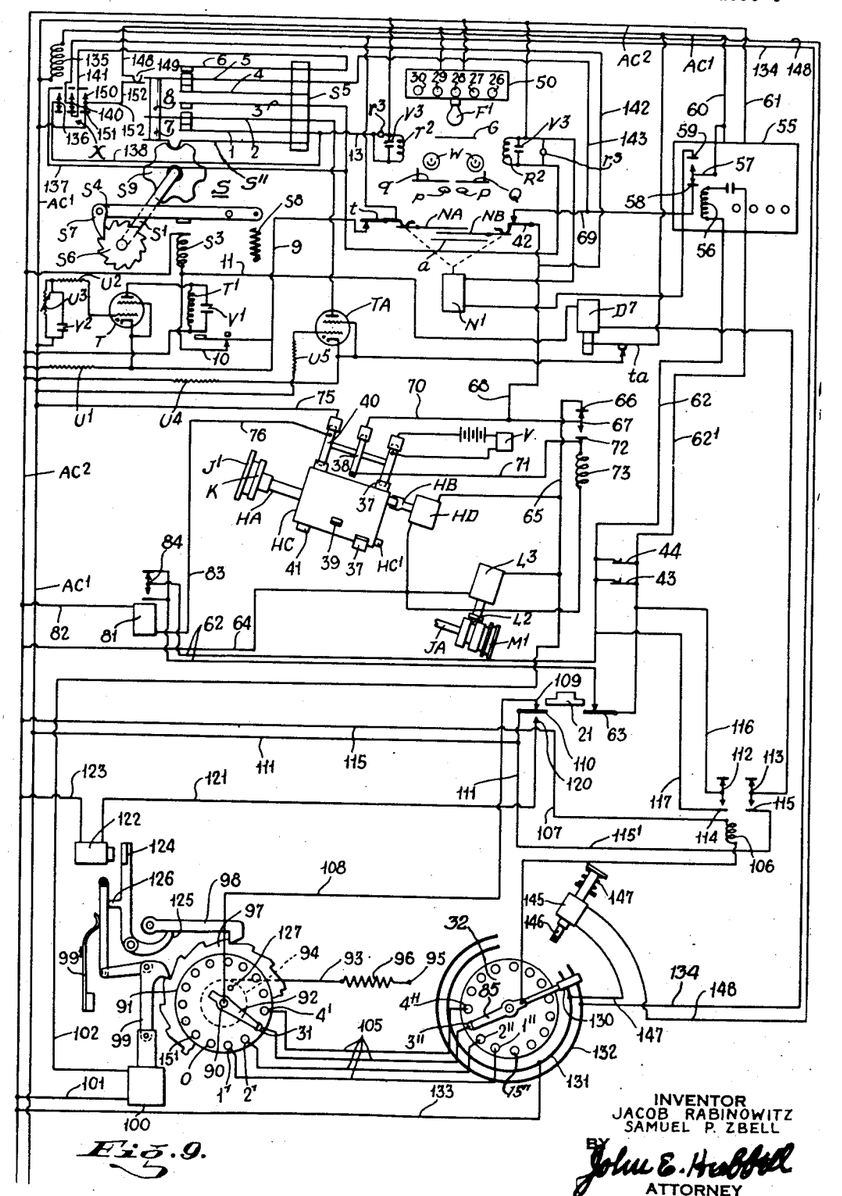
Fig. 9 is a control circuit diagram.

The generally automatic operation of the printer in the manner and for the purposes described herein is advantageously effected and controlled by a control system including some manually operable control element, and one form of which is illustrated diagrammatically in Fig. 9. The manually operable control elements used in the regular operation of the printer, are mounted in a control panel 20 attached to the printer housing for convenient actuation by the printer operator and comprise a starting switch 21, exposure time regulation switches 22, 23, 24 and 25, printing lamp control switches 26, 27, 28, 29 and 30, and a selector switch 32. Actuation of each of the switches 21—30 is advantageously indicated by the energization of a corresponding pilot lamp 31.

The selector switch 32 is a rotatable switch which can be manually turned by a knob 33 into any one of a plurality of different positions corresponding in number to the number of pictures to be successively printed from one picture G, following a single actuation of the starting switch 21. The maximum number of pictures which can be printed from one negative in a single printing operation depends, of course, upon the design of the selector switch and associated mechanism. In the arrangement shown by way of example, the selector switch has fifteen different operative positions, each indicated on the panel 20 by a suitable symbol with a pilot lamp 35 alongside each symbol. A pointer or index 34 of the switch 32 is successively moved into register with the different symbols as the switch is moved successively through its different operating positions. During each series printing operation the index 34 remains in register with the symbol on the panel corresponding to the number of pictures being printed in that operation.

In addition to the control switches already mentioned, the control system includes switches 36, 38, 40, 42, 43 and 44, actuated on the movements of particular printer mechanism parts into particular positions, and operating to suitably time different printer operations, or to insure safe operation.

The switches 36, 38 and 40 are actuated in accordance with changes in the angular position of the measuring roller H'. As shown, the switches 36, 38 and 40 are normally open, while the roller H' is in rotation, but are closed while respectively engaged by projections 37, 39 and 41 extending away from the periphery of the cylinder or drum HC carried by the driving shaft HA for the measuring roller H'. Since in the particular arrangement shown, each operative movement of the roller H' is through an arc of 180°, the projections 37, 39 and 41 are duplicated on diametrically opposed portions of the periphery of the drum HC.

The closure of the switch 36 energizes a control magnet for a brake (not shown) which may be used to control the rotation of the supply roll H and the tension put on the film $a$ during the printing operations, and each of corresponding projections 37 is elongated in the direction of its circular movement, so that the switch 36 will close somewhat prior to the completion of each feeding movement of the roller H' and will remain closed until the following feeding movement is initiated. The closure of switch 38 effects circuit adjustments hereinafter described, controlling the operation of the series printing mechanism. The projections 41 are so positioned that the switch 40 is closed at the end of each feeding movement of the roller H' and as is hereinafter more fully explained, each closure of the switch 40 results in the opening of the shutter J for printing each picture, except the first, of the plurality of pictures printed in a series printing operation.

The switch 42 is biased to its open position, but is closed by the main shutter mechanism N as the shutter flap NB turns into its closed position. The switches 43 and 44 are safety switches respectively controlled by the positions of the picture holder $d$, and a film supporting platen beneath the orifice I, each being open or closed accordingly as its controlling element is, or is not, in its normal operative position. The control system also includes various other switches, circuit conductors and control elements to which suitable reference will be made in the following description of the operation of the printer mechanism disclosed.

In the normal operation, lamp energizing current is supplied by supply conductors AC1 and AC² to the printing lamp F' as required to insure the proper intensity of light transmission from the lamp through the picture G and lens P and $p$. As shown, the lamp F' is connected to branches of the supply conductors AC' and ACC² through a control device O, including the previously mentioned panel switches 26—30. If and when it becomes desirable to manually control the voltage impressed on the lamp one or another of the switches 27, 28, 29 and 30 of the device 51 is actuated. Thereupon the voltage applied to the terminals of the lamp F' is varied in a manner which is selectively dependent upon which one of the different switches 27, 28, 29 and 30 is actuated.

Figure 2:
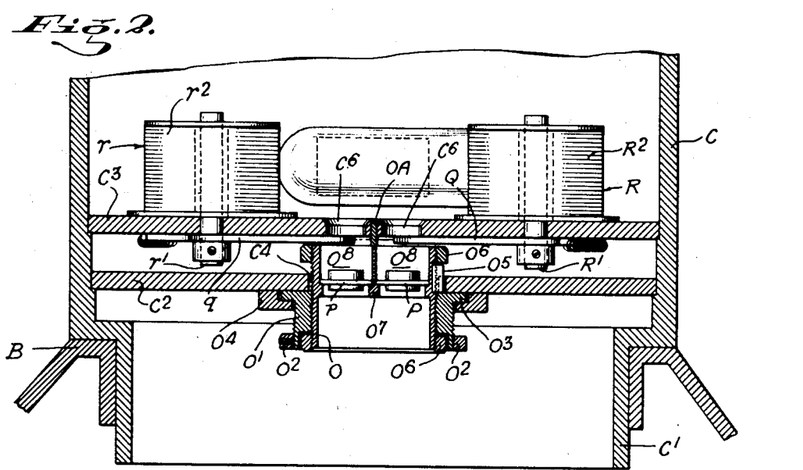
Fig. 2 is a section of a portion of the apparatus shown in elevation and on a smaller scale in Fig. 1.
Figure 3:
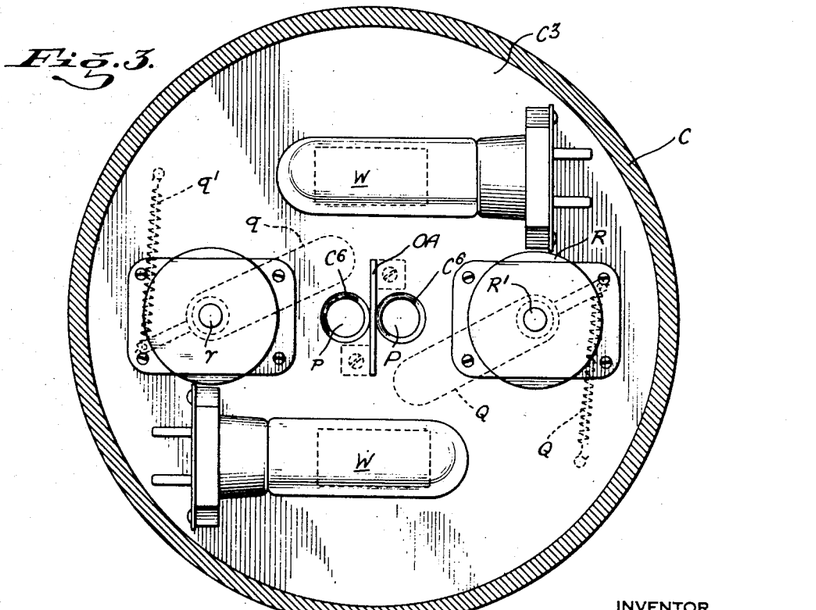
Fig. 3 is a plan section on line 3—3 of Fig. 1, illustrating the double lens and blind arrangement.

As diagrammatically indicated in Fig. 9, the exposure period, during which the shutter N is open in printing a picture from a particular transparency, is controlled by control apparatus 55 in automatic response to the intensity of light received by two photoelectric tubes W from the lamp F' through the picture G. As shown in Figs. 2 and 3, the two tubes W are mounted on the disc C³ at opposite sides of the orifices C⁶, in diametrically opposed quadrants between those in which the relays R and $r$ are located. So disposed, the photo tubes W collectively receive light of an intensity which is a fair average of the total light transmitted by the transparency G. The photo cells are connected in parallel in a condenser discharging circuit included in the device 55 and forming a part of an automatic exposure timing system which keeps the shutter N open during the exposure period, which is the period required for a predetermined change in the condenser charge. The duration of that period depends on the conductivity of the tubes W and their conductivities increase and decrease with increases and decreases in the intensity of the light transmitted through the transparency G to the tubes W.

In the preferred form of the present invention, the automatic exposure timing means included in the device 55 is of the type disclosed and claimed in the Patent 2,469,076, granted May 3, 1949, on an application filed May 18, 1945, by Jacob Rabinowitz, one of the applicants herein.

As explained in that application, different transparencies having the same average light transmitting capacities may require exposures for different periods to obtain the optimum reproduction effects with each transparency. In accordance with the invention of the last mentioned application, each transparent picture is examined and graded as requiring a longer or shorter exposure period than a basic period which gives the optimum reproduction results for the average transparency having the same light transmitting capacity as the transparency being graded. Thus, if the basic light transmitting capacity of a particular transparency makes its basic exposure period five seconds, that particular transparency may be found to give better reproduction results if the actual exposure period is not five seconds but is seven and a half, ten, two and a half, or one and a quarter seconds and in such case switch 23, 24, 25 or 26, respectively, should be actuated. The particular exposure periods just stated are given by way of example and illustration. In practice those periods depend upon the design and calibration of the control device 55, and may be varied to meet in accordance with conditions of operation. Moreover, the general operation of the printer mechanism disclosed herein may be effected by the use of other known exposure period control arrangements.

In the arrangement shown, each exposure period is initiated by the deenergization of a relay winding 56 and the resultant movement of a movable relay contact 57 out of engagement with a stationary lower contact 58 into engagement with a stationary upper contact 59. The engagement of the contacts 57 and 59 closes an energizing circuit for the solenoid N' which is thereby actuated to move the shutter flaps NA and NB into their open position. That energizing circuit includes a branch 60 of the supply conductor AC' to which the movable contact 57 is connected, and a connection between one terminal of the solenoid N' and the contact 58; and a connection between the second terminal of the solenoid N' and the supply conductor AC². The solenoid N' is deenergized and the shutter flaps NA and NB are again closed when the subsequent re-energization of the relay winding 56 draws the contact 57 out of engagement with the contact 59. As diagrammatically shown, the energizing circuit for the winding 56 includes conductor sections 62 and 62' normally connected by a switch member 63. The latter is momentarily moved to disconnect said sections when the starting switch 21 is depressed. The return of the switch member 63 to its closed position, while necessary to the reenergization of the winding 56, need not occur immediately, since the movement of the switch member 63 to its open position initiates the discharge of the previously charged condenser not shown herein, but fully disclosed in said prior application, Serial No. 594,403. Until that condenser is sufficiently discharged the winding 56 cannot be reenergized so as to terminate the exposure period.

In normal operation during periods in which pictures are being simultaneously printed on the upper and lower halves of each longitudinal section of the film $a$, each closure of the shutter N initiates a film feeding operation. During periods in which pictures are successively printed on the upper and lower halves of a film section, a film feeding operation is initiated by the closure of the shutter N only when that closure follows the printing of a picture on the lower half of the film. The closure of the shutter N closes the previously mentioned switch 42, and thereby initiates a film feeding movement when, and only when the movable relay contact 67 is in the position shown in Fig. 9 in which it engages the stationary contact 66. The contact 67 is biased to the position in which it engages the contact 66, but is held out of that position when the relay 73 is energized. As is hereinafter explained, the contacts 5 and 6 of the relay S cooperate to maintain the energization of the relay 73 during the period in which the shutter N is closed following the printing of a picture on the upper half only of the film $a$.

As is indicated by Fig. 9, the relay N' cannot be energized while the relay winding 56 is energized and holds the contact 57 out of engagement with the contact 59. The closure of either of the safety switches 43 and 44 or of any other safety switch which may be connected across the conductors 62 and 62', is adapted to maintain the energization of the relay winding 56. When the safety switches connected across the conductors 62 and 62' are in their open safe positions the manual depression of the switch 21 will open the switch 63 and thereby deenergize the winding 56 and thereby initiate a printing operation. If the operation so initiated is a series printing operation, the necessary subsequent shutter opening movements will be automatically effected by the periodical energization of a relay 81 effected by the closure of the switch 40 at the end of each film feeding operation. The relay 81 is a delay or slow acting relay and the closure of its energizing circuit results in a movement of the movable contact 84 between its upper and lower positions which disconnects the conductors 62 and thereby open-circuits the relay winding 56 for a period long enough to effectively energize the shutter relay N' and open the shutter N.

The manner in which the switch 40 is closed and energizes the relay 81 is hereinafter described.

On the closure of the switch 42 at a time in which the contacts 66 and 67 are in engagement, the solenoids L³ and HD are energized to permit rotation of the drive shaft HA through the single revolution clutch L and the rotation of the measuring roller H' through the shaft H and gears J and J'. As shown, each of the solenoids L³ and HD has one terminal connected by a conductor 64 to the supply conductor AC², and has its second terminal connected through a conductor 65 to the upper stationary contact 66 and thereby to the movable contact 67 which is connected through a conductor 68 to the switch 42 and thence through a conductor 69 to the lower contact 58 of apparatus 50. Contact 58 is normally engaged by the associated movable contact 57 and the latter is connected to the supply conductor AC' through the conductor 60.

The energizing circuits for the solenoids L³ and HD established as just described, are interrupted soon enough to prevent the drive shaft I from making more than one revolution, and to prevent the measuring roller H' from making more than a half revolution. This result is accomplished with the arrangement shown in Fig. 9 by means of the switch 38 which has one terminal 70, connected to the conductor 68 and has its second terminal 71 connected to a stationary contact 72. The latter is the lower contact of the relay switch including the previously mentioned movable contact 67. Contact 67 engages the contact 72 when the relay winding 73 is energized. The upper end of the winding or coil 73 is connected to contact 72 and the lower end of winding 73 is connected by a conductor 74 to the branch 61 of the supply conductor AC². With the switch 42 closed and with switch contact 57 of apparatus 55 in its normal lower position, the conductor 68 is connected through switch 42, conductor 69, stationary contact 58 and movable contact 57 to the branch 60 of the supply conductor AC'. In consequence, the closure of the switch 38 energizes the relay winding 73 which pulls movable relay contact 67 out of engagement with the upper stationary relay contact 66 and thus deenergizes the solenoids L³ and HD. The closure of the switch 38 is properly timed for its described purposes, by locating the corresponding switch actuating projections 39 on the drum HC, so that the switch 38 will be momentarily closed during an intermediate portion of each feeding movement of the measuring roll H'.

Following the completion of each half turn of the feed roller H', one of the projections 41 of the drum HC engages the switch 40 and closes the latter, and thus closes the energizing circuit of the relay device 81. The latter has one terminal 82 connected to the supply conductor AC², and has its second terminal 83 connected to supply conductor AC' through the switch 40 and a conductor 75 when switch 40 is closed. The relay device 81 previously mentioned is a so-called delay relay which gives movements to a movable relay contact 84 to effect opening movements of the shutter N in series printing, as hereinbefore stated.

As previously pointed out, the selector switch 32 determines by its adjustment position at the beginning of each printing operation, whether the number of pictures printed from the transparency G then in the holder $d$ is one, two or any other equal number up to the maximum, which, with the apparatus shown, is 28. The switch 32 determines the number of pictures printed in each series printing operation by virtue of its inclusion of a switch arm 85 which engages contacts 1″—15″ on the back of the panel 20 and is thereby cooperatively associated with a second rotary switch 90. The latter is journalled in a support 91 and in front of the latter carries a switch arm 92 movable counter-clockwise from an initial position 0, in successive steps, one for each printing operation, through corresponding stations 1′, 2′, 3′, 4′, up to the final station 15′. The switch 90 is biased for movement in a clockwise direction, back to its initial position when displaced therefrom. The biasing means diagrammatically shown, comprises a cord or other flexible element 93 having one end secured to a drum portion 94 of the switch 90, with an adjacent portion of the cord wound around the drum. The opposite end of the cord is connected to a stationary anchorage 95 through a tension spring 96.

While each series printing operation is in progress, the switch member 92 is prevented from returning to its zero position by means of a ratchet wheel 97 secured to the switch member 90, and a locking pawl 98 pivoted to a stationary support and engaging one or another of the teeth of ratchet wheel 97. Also during the course of each series printing operation, the ratchet wheel 97 is angularly advanced through an angular distance corresponding to the angular distance between two adjacent teeth on each feeding movement of the feed roller H′ until the number of said feeding movements are those required for the printing of all of the pictures to be printed in that series printing operation. As diagrammatically shown, the ratchet wheel 97 is thus angularly advanced a tooth at a time by means of a pawl 99 pivoted to the core of a solenoid 100, and biased by a spring 99′, to engage the ratchet wheel. The solenoid 100 has one terminal connected by a conductor 101 to the supply conductor AC′, and has its second terminal connected by a conductor 102 to the previously mentioned conductor 65 through normally closed relay switch contacts 103, 104. In normal operation the solenoid 100 is temporarily energized whenever the solenoids $L^3$ and HD are energized, i. e., the solenoid 100 is energized once for each feeding movement of the shaft HA and measuring roller H′.

During each series printing operation, the feeding movements of the roller H′ continues until the required number of pictures have been printed. Thereafter, further feeding movements of the roller H′ and further movements of the ratchet wheel 97 by the solenoid 100 and pawl 99, are prevented as a result of the establishment of an electric circuit including the switch arms 85 and 92. As will be apparent, the switch arm 92 will then be displaced from its neutral or zero position by a number of steps which depends upon the particular station on the panel 20 with which the index 34 is then in register. The circuit, including the switch arms 85 and 92 established at the end of a series printing operation, comprises whichever of a circular series of stationary contacts 1—15 supported at the rear of the panel 20, is engaged by the switch arm 85 when the index 34 is in register with the corresponding position at the front of the panel. Each of the circular series of contacts 1′, 2′, 3′—15′ carried by the switch support 91 is connected to the corresponding contact 1″, 2″, 3″, etc. by the corresponding individual conductor 105. Thus with the adjustment of the switch 85 shown in Fig. 9, the circuit established to prevent further feeding movements of the roller H′ includes the conductor 105, connecting contacts 3′ and 3″.

The contact arm 85 of the switch 32 is connected to the supply conductor $AC^2$ through a relay winding 106 and a conductor 107. The switch arm 92 is normally connected to the supply conductor AC′ by a circuit branch comprising a conductor 108, terminating in a contact 109, a pivoted switch member 110 engaging the contact 109 and a conductor 111. Therefore, when the switch arms 85 and 92 are connected by a conductor 105, the relay winding 106 is energized and moves the associated movable contact members 112 and 113 from their normally upper positions into engagement with stationary lower contacts 114 and 115, respectively. The contact 112 is connected by a conductor 116 to the control conductor 62′ and the contact 114 is connected by a conductor 117 to the control conductor 62.

The normal printing operation cannot occur while the winding 106 is energized because the shutter N cannot be opened with the contact 112 in its lower position, and because the down movement of the contact 113 closes an energizing circuit for the solenoid $D^7$ and thereby unlocks the picture holder d and the latter cannot be re-locked in place until the contact 113 moves to deenergize the solenoid $D^7$.

The depression of the starting switch member 21 moves switch member 63 into its open position and also moves the switch member 110 out of engagement with the contact 109 and into engagement with a contact 120. The latter is connected by a conductor 121 to one terminal of an electro-magnetic relay 122. The latter has its second terminal connected by a conductor 123 to the supply conductor $AC^2$. Since the switch member 110 is connected by the conductor 111 to the supply conductor AC′, its engagement with the contact 120 energizes the electromagnet relay 122. On the energization of the relay, the arms 125 and 126 of its pivoted armature 124 moves the pawls 98 and 99 out of engagement with the teeth of ratchet wheel 97. Thereupon spring 9 turns switch element 90 into its zero position in which switch arm 92 engages a stop 127. The depression of the switch member 21 which resets the switch arm 92 in its zero position, will not initiate a new picture printing operation since the picture holder d is then out of its operative position, and the armature of solenoid $D^7$ hold, switch 43 closed except when locking dog D enters the locking aperture $d^5$ in the holder d Whenever two pictures are to be simultaneously printed on the upper and lower halves of a section of the film a to fill an order for two or more pictures, it is necessary that both relay windings $R^2$ and $r^2$ should be energized so that both auxiliary shutters or blinds Q and q will then be held in their open positions. This result may be obtained with the apparatus shown diagrammatically in Fig. 9, by electrically connecting the contacts 1 and 3 during periods in which two pictures are to be simultaneously printed, so that both windings $R^2$ and $r^2$ will be energized when the valve TA is made conductive, regardless of whether the contact 2 of the ratchet relay S is then in its upper or its lower position. As diagrammatically shown in Fig. 9, the means employed to electrically connect the relay contacts 1 and 3 when two pictures are to be printed simultaneously, comprise a bridging contact 130 carried by, but insulated from the switch arm 85, and two stationary arc shaped contacts 131 and 132. The contacts 130, 131 and 132 are so relatively disposed, and the contacts 131 and 132 are of such angular extent that the contact 130 does not engage the contacts 131 and 132 when the switch arm 85 is in engagement with the contact 1″, but does engage the contacts 131 and 132 when the switch arm 85 is moved into engagement with or intermediate the contacts 2″ and 30″. The contact 131 is connected to the supply conductor $AC^2$ by a conductor 133, and the contact 132 is connected by a conductor 134 to one terminal of the winding 135 of a relay X which has its second terminal connected to the supply conductor $AC^2$.

As will shortly be explained, the relay X not only insures by its own energization the simultaneous energization of the relay R, but serves on its deenergization to prevent a film feeding operation and to prevent an adjustment of the selective switch 32 to a series printing position except after printing operation, in which an image is printed on the lower half $a'$ of the film $a$.

The energization of the winding 135 of the relay X, which is effected when the switch arm 85 is in engagement with any of the contacts 2″—15″, establishes an electrical connection between the terminals of the relay windings $R^2$ and $r^2$, respectively connected to the contacts 3 and 1 of the relay S. The relay X establishes that connection by moving the relay contact 136 into engagement with an associated upper stationary contact. The latter is connected by a conductor 137 to the conductor 12 and thereby to the contact 3 of the relay S, while the relay contact 136 is connected by a conductor 138 to the conductor 13 and thereby to the contact 1 of the relay S. With the conductors 12 and 13 electrically connected as described, the engagement of the contact 2 with either of the contacts 1 or 3 of the relay S will thus effect the energization of both of the auxiliary shutter relays R and $r$ during periods in which the valve TA supplies energizing currents to the relay windings $R^2$ and $r^2$. During the period in which the relay X is energized, operation of the ratchet S is unnecessary and, if desired, the relay X may be adapted to keep the circuit of the ratchet relay winding $S^3$ open while the relay winding 135 is energized.

The relay X on its deenergization prevents a film feeding operation after the printing of a picture on the upper half of the film $a$ without printing a picture on the lower half of the film by short circuiting the switch 42 during periods in which the selector switch is in position to print a single picture, and in which the contacts 5 and 6 of the ratchet relay S are in engagement. As previously explained, said contacts 5 and 6 are in engagement at the end of each period during which a picture has been printed only on the upper half of the film $a$. This result is accomplished with the apparatus shown in Fig. 12, by means including a second movable contact 140 associated with the relay winding 135. When the relay X is deenergized, as it is when the switch arm 85 is in engagement with the contact 1″, the contact 140 is biased into engagement with a lower stationary contact. The latter is connected by a conductor 141 to the contact 6 of the relay S. A conductor 142 connects the movable contact 140 to the conductor 68. The contact 5 of the relay S is connected by a conductor 143 to the conductor 69. In consequence, when the relay X is deenergized, the contact 140 and conductors 141, 142 and 143 short-circuit the switch 42 so that the opening of the latter will not disconnect the conductors 68 and 69. As has been previously explained, the closure of the main shutter N and resulting closure of the switch 42 can produce a film feeding operation only when the relay winding 73 is deenergized as the result of a previous opening movement of the switch 42.

The relay X when deenergized is arranged to prevent the operator from adjusting the apparatus into the condition in which it will simultaneously print pictures on the upper and lower halves of one section of the film until a picture has been printed on each half of the preceding film section. The last mentioned result is attained in a convenient manner by providing the selector switch mechanism with locking means which will prevent the switch arm 85 from being turned from a position in which it engages the contact 1″, into position to engage any of the contacts 2″—30″, while the ratchet relay S holds the spring contacts 1 and 5 out of the lower positions which they occupy during each period in which a single picture is produced by printing that picture on the lower half of the film $a$.

As diagrammatically shown in Fig. 9, the last mentioned result is obtained by providing a locking relay 145 including a locking dog 146 which is biased for movement out of a position in which it prevents the switch arm 85 from being moved clockwise into the position in which it engages the contact 2″. When the winding of the relay 145 is energized, the locking dog 146 is advanced in the position in which it restricts the angular movement of the switch lever 85. The relay 145 has one terminal permanently connected through a conductor 147 to the arc shaped contact 131 and conductor 133 to the supply conductor $AC^2$. The second terminal of the relay 145 is connected to the supply conductor $AC'$ through a conductor 148, a switch 149 and a second switch including a movable contact 150 associated with the relay winding 135. The movable contact 150 is biased for engagement with a stationary contact 151 connected to the supply conductor $AC'$. The contact 150 is moved out of engagement with the contact 151 when the relay winding 135 is energized. The movable contact 150 is connected by a conductor 152 to one terminal of the switch 149. The second terminal of that switch is connected to the conductor 148. The switch 149 is biased to its closed position but is opened by the relay S when the latter is actuated to move the contacts 1 and 5 into their lower positions. As shown in Fig. 9, the switch 149 is so arranged that when the free end of the contact 5 moves to its lower position it opens the switch 149.

In said prior Pavelle application, Serial No. 614,628, it is explained how the apparatus disclosed in common in that application and herein is adapted for use in a printer in which a natural color picture is reproduced by reflected light. The apparatus features disclosed herein and not disclosed in said prior Pavelle application are obviously adapted for use in a printer reproducing pictures by reflected light.

The apparatus disclosed herein has been found to be relatively simple and reliable in operation, and well adapted for its intended purposes. A special advantage of the use of the thyratrons T and TA is the elimination of the hum and vibration in the relay windings T', R² and r² which would be experienced if those windings were energized by alternating current instead of by the unidirectional current in the anode circuits of the thyratrons. Such vibration would be especially objectionable because of its tendency to give a fuzzy appearance to the pictures printed.

While in accordance with the provisions of the statutes, we have illustrated and described the best form of embodiment of our invention now known to us, it will be apparent to those skilled in the art that changes may be made in the form of the apparatus disclosed without departing from the spirit of our invention as set forth in the appended claims, and that in some cases certain features of our invention may be used to advantage without a corresponding use of other features.

Having now described our invention, what we claim as new and desire to secure by Letters Patent, is:

1. A projection printer comprising in combination, a picture holder, mechanism operable to maintain a section of photographic material in a printing position, first and second lenses adapted to project separate images of a picture held by said holder on to side by side portions of said section, a separate auxiliary shutter associated with each lens, auxiliary shutter adjusting means selectively operable to move each auxiliary shutter between open and closed positions in which it respectively permits and prevents image projection by said lens, a main shutter, and a main shutter operating mechanism including means responsive to the average intensity of the projection light transmitted to said photographic material section from said picture and operable to effect and control the duration of the exposure of each photographic material section portion on which an image is then being projected 2. A projection printer comprising in combination, a picture holder, means operable to maintain a section of photographic material in a printing position, first and second lenses adapted to project separate images of a picture held by said holder onto side by side portions of said section, a separate auxiliary shutter associated with each lens and adjustable between open and closed positions in which it respectively permits and prevents image projection by said lens, adjusting means selectively operable to move said shutters into their open positions simultaneously, or successively, a main shutter operable to effect and control the duration of an exposure of each portion of said photographic material section on which an image is then being projected, and a main shutter operating mechanism including means responsive to the average intensity of the projection light transmitted to said photographic material section from said picture through said lenses for closing said main shutter to terminate each exposure.

3. A projection printer comprising in combination, a picture holder, means operable to maintain a section of photographic material in a printing position, first and second lenses adapted to project separate images of a picture held by said holder onto side by side portions of said sections, a separate auxiliary shutter associated with each lens and adjustable between open and closed positions in which it respectively permits and prevents image projection by said lens, adjusting means selectively operable to move said shutters into their open positions simultaneously, or successively, a main shutter operable to effect an exposure of each portion of said photographic material section on which an image is then being projected, and means preventing said adjusting means from being operated to move said shutters into their open positions simultaneously when the last preceding operation of the main shutter was one in which the projection of an image by said second lens was prevented.

4. A projection printer comprising in combination, a picture holder, means operable to maintain a section of photographic material in a printing position, first and second lenses adapted to project separate images of a picture held by said holder onto side by side portions of said section, a separate auxiliary shutter associated with each lens and movable between a position in which it does, and a position in which it does not close said lens, a separate electromagnetic relay for adjusting each of said shutters between its two positions, a main shutter operable to expose said photographic material section, and means controlling the positions of said auxiliary shutters comprising a relay mechanism actuated by each operation of said main shutter and including switch means operable in one condition of said mechanism to open said auxiliary shutter alternately on successive actuations of said main shutter and operative in a second condition of said mechanism to open both auxiliary shutters on each actuation of said mechanism, and manually controlled means for varying the condition of said mechanism.

5. A projection printer comprising in combination, a picture holder, means intermittently operable to move successive sections of photographic material into and out of a printing position, first and second lenses adapted to project separate images of a picture held by said holder onto side by side portions of the section of photographic material in said printing position, a separate auxiliary shutter associated with each lens and adjustable between open and closed positions in which it respectively permits or prevents image projection by said lens, adjusting means selectively operable to open said shutters simultaneously or successively, a main shutter operable to effect and control the duration of an exposure of each portion of said photographic material on which an image is then being projected, main shutter operating mechanism including means responsive to the average intensity of the projection light transmitted to said photographic material section from said picture through said lenses for closing said main shutter to terminate each exposure and means jointly controlled by the operation of said main shutter and by the adjustments of said auxiliary shutters for moving an exposed material section out of, and an unexposed section into said printing position following each operation of the main shutter which occurs during a period in which the auxiliary shutter for said second lens is open.

6. A projection printer comprising side by side first and second lenses adapted to project two images of a picture to be reproduced on side by side longitudinal portions of a strip of photographic material section occupying a printing position, first and second auxiliary shutters respectively associated with said first and second lenses and each movable between lens open and lens closed positions, means selectively operable to simultaneously move both shutters into their open position or to successively move the shutters respectively associated with said first and second lens into their open positions in the order stated, and strip advancing mechanism controlled by the operation of said shutters and including means dependent on the position of each auxiliary shutter for operating, following either the simultaneous or the successive movements of the two shutters into their open positions, to move the section of said strip previously occupying said printing position out of that position and simultaneously move an unexposed section of said strip into said printing position.

7. A projection printer structure having displaced picture and printing positions and means for holding a picture and photographic material in said picture and printing positions, respectively, a lens holder mounted in said structure between said picture and printing positions, a pair of side by side lenses mounted in said lens holder, an orifice member interposed between said picture position and lens holder and formed with side by side orifices respectively associated with the two lenses for the passage of a separate image forming light beam to said printing material from said picture through each orifice and the corresponding lens, a separate shutter for opening and closing each of said orifices pivoted on said orifice member for movement into and out of the position in which it closes said orifice, a main shutter operable to effect and control the duration of an exposure of each portion of said photographic material on which an image is being projected through one of said separate shutters, and main shutter operating mechanism including means responsive to the average intensity of the projection light transmitted to said photographic material section from said picture through said lenses for closing said main shutter to terminate each exposure.

8. A projection printer comprising in combination, a picture holder, an intermittently operable feeding mechanism adapted on each operation to move one photographic material section out of, and another section into a printing position, first and second lenses adapted to project separate images of a picture held by said holder onto side by side portions of the material section in said printing position, a separate auxiliary shutter associated with each lens and adjustable between open and closed positions in which it respectively permits and prevents image projection by said lens, adjusting means operable to adjust the said shutters respectively associated with said first and second lenses into their open positions simultaneously, or successively in the order stated, a main shutter intermittently operable to effect an exposure of each portion of said photographic material on which an image is then being projected, means for operating said feeding mechanism following each operation of the main shutter during a period in which the auxiliary shutter associated with said second lens is in its open position, means including a control element adjustable into different positions to effect a single operation of said main shutter when said device is in one adjustment position and to effect a plurality of main shutter operations when said device occupies another position, and means dependent on the adjustment of the shutter associated with said second lens and operable to prevent the adjustment of said device into said other position during a period when the last mentioned shutter is in its closed position.

9. A projection printer comprising in combination, a picture holder, an intermittently operable feeding mechanism adapted on each operation to move one photographic material section out of, and another section into a printing position, first and second lenses adapted to project separate images of a picture held by said holder onto side by side portions of the material section in said printing position, a separate auxiliary shutter associated with each lens and adjustable between open and closed positions in which it respectively permits and prevents image projection by said lens, a separate electromagnetic relay associated with and operable to adjust each of said shutters between its said positions, a main shutter intermittently operable to effect an exposure of each portion of said photographic material on which an image is then being projected, a circuit network having terminals for connection to a source of current and including a switch opened and closed by the opening and closing of the main shutter, a relay switch mechanism energized on each closure of said switch and including switching means adjusted on each energization of said mechanism and normally operative to energize said electromagnetic relays alternately when said switch mechanism is successively energized, and manually controlled means operative to adjust said mechanism so that it will energize both electromagnetic relays on each closure of the first mentioned switch.

10. A projection printer combination comprising a picture holder, mechanism operable to maintain a section of photographic material in a printing position, first and second lenses adapted to project separate images of a picture held by said holder on side by side portions of said section, a separate shutter associated with each lens and means for adjusting each shutter between open and closed positions in which it respectively permits and prevents image projection by said lens, a separate electromagnetic relay for adjusting each shutter between its said conditions, a relay energizing system comprising energizing conductors, an intermittently operable control device and circuit closing means normally actuated by said device to operatively connect said relays to said conductors alternately when said control device is successively operated, and means for adjusting said circuit connecting means to operatively connect both relays simultaneously to said conductors on each operation of said device.

JACOB RABINOWITZ.
SAMUEL P. ZBELL.

REFERENCES CITED

The following references are of record in the file of this patent:

UNITED STATES PATENTS

| Number | Name | Date |
|---|---|---|
| 1,819,541 | Carleton | Aug. 18, 1931 |
| 1,993,178 | Mitchell | Mar. 5, 1935 |
| 2,030,795 | Hudeley | Feb. 11, 1936 |
| 2,172,330 | Bryce | Sept. 5, 1939 |
| 2,298,344 | Burnham | Oct. 13, 1942 |
| 2,333,389 | Ringer | Nov. 2, 1943 |
| 2,353,218 | Burnham | July 11, 1944 |